Oct. 20, 1931.  A. GALBARINI  1,828,654
ACOUSTIC INSTRUMENT
Filed April 26, 1930
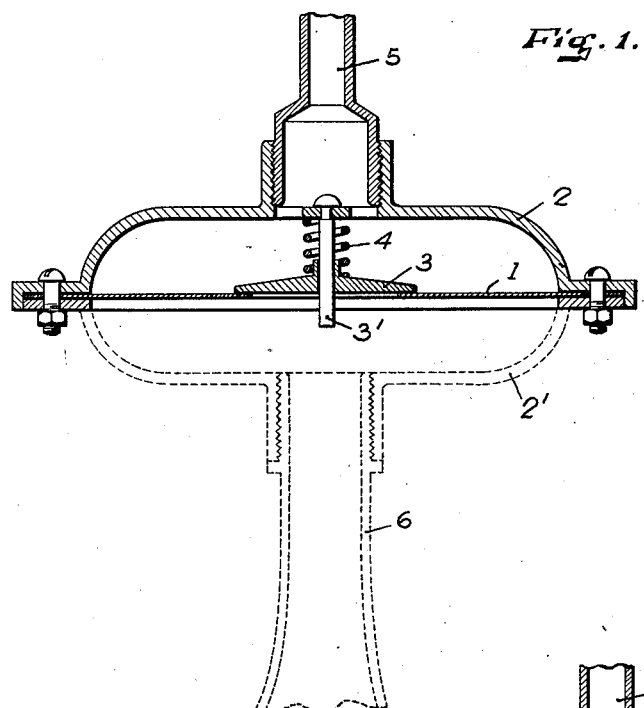
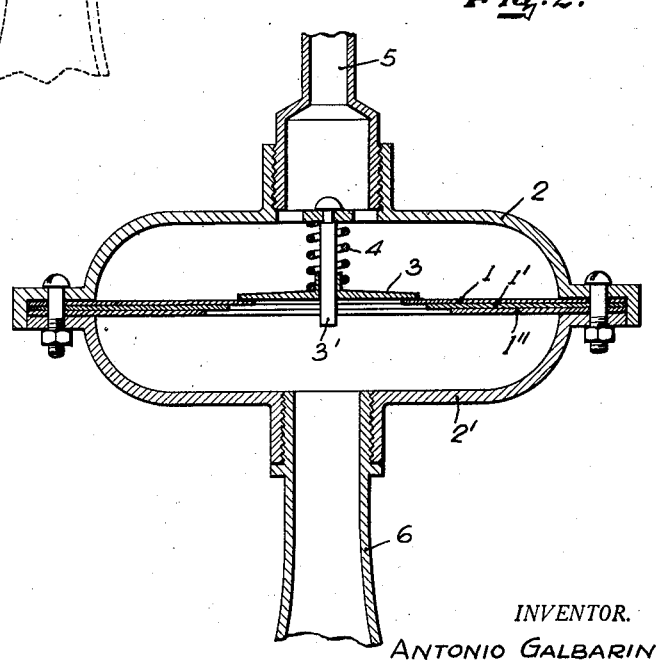
INVENTOR.
ANTONIO GALBARINI,
BY Duell, Dunn & Anderson
ATTORNEYS.

Patented Oct. 20, 1931

1,828,654

UNITED STATES PATENT OFFICE

ANTONIO GALBARINI, OF MILAN, ITALY

ACOUSTIC INSTRUMENT

Application filed April 26, 1930, Serial No. 447,737, and in Germany May 2, 1929.

The present invention relates to a functionally and structurally improved acoustical instrument capable of use in numerous different associations but primarily intended as a warning signal for installation on vehicles, as well as land and sea signalling stations.

It is an object of the invention to provide an article of this character which will be operated by fluid pressure and preferably by vacuum, although it is within the province of the present invention to operate the same by pressure. As such, the present instrument—when properly adjusted—will function to produce a tone which while not disagreeable or of apparent large volume, will nevertheless have great carrying power and be of such a nature that the attention of any person within its range will be drawn to the fact that it is operating.

A further object is that of furnishing an apparatus of this character, the parts of which will be relatively few in number and each individually simple and rugged in construction, these parts being capable of manufacture largely by automatic machinery and also capable of assemblage and adjustment by relatively unskilled labor to provide an instrument operating over long periods of time with freedom from difficulties.

With these and other objects in mind, reference is had to the attached sheet of drawings illustrating practical embodiments of the invention and in which:

Fig. 1 is a longitudinal section of one form, and Fig. 2 shows another form of horn.

Referring to Fig. 1, the membrane 1 is secured at its periphery to a dish shaped base member 2. The membrane 1 is provided with a central aperture, which latter is closed by a disc valve 3 whose diameter is greater than the diameter of the aperture in the membrane 1. The disc valve 3 is loosely mounted on a guide rod $3^1$ and a helical spring 4 interposed between the base member 2 and the valve 3 causes the latter to bear against the membrane 1.

The disc 3 is adapted to move parallel to its axis by overcoming the tension of the spring 4 and during this movement the valve 3 is guided by the rod $3^1$ extending from the base member 2.

If desired a cover $2^1$ shown in dotted lines in Fig. 1 may be provided so that the membrane is completely enclosed in a housing divided into two parts.

The device according to Fig. 1 can only be operated by a vacuum produced in the chamber formed by the base member 2 and the membrane 1. The device according to Fig. 2 can however be operated by a vacuum as well as by air pressure. If a vacuum is produced in the chamber enclosed by the base member and membrane, the disc valve 3 owing to atmospheric pressure will be lifted and air will enter into the said chamber and stream through the opening between the edge of the disc and the edge of the aperture in the membrane 1. A current of air so produced, by means of its velocity, causes the membrane 1 and/or the valve 3 to vibrate, whereby a sound is produced which is variable according to the dimensions, thickness and substance of membrane 1 and disc valve 3 and further also depending upon the intensity of the air current and strength of the spring 4. When the device is provided with a cover $2^1$, the sound produced may be amplified by a sound trumpet 6 shown in dotted lines in Fig. 1.

The method of working the device constructed according to Fig. 2 is similar to Fig. 1, if, instead of producing a vacuum between the base member 2 and membrane 1, a compressed air current is passed into the half chamber between the membrane 1 and cover $2^1$, in this case the tone produced may be amplified by a trumpet.

In order to be able to operate the apparatus alternately by air pressure or by vacuum, it is sufficient to interchange a nozzle 5 connected to the base member 2 with the sound trumpet 6. The apparatus can be operated by air pressure by leaving the nozzle 5 and trumpet 6 in the positions shown in the drawings, if the valve 3 and helical spring 4 are arranged on the other side of the membrane 1. It will also be understood that in lieu of the helical spring, any desired resilient or flexion member in the nature of a leaf, plate, diaphragm, etc. might be employed.

The membrane 1 need not consist of a single spring leaf, it can be made of several elastic leaves arranged one above the other as shown in Fig. 2. The leaves 1ᴵ and 1ᴵᴵ are so arranged that they are supported on each other and on the membrane 1. Each of the leaves 1ᴵ and 1ᴵᴵ is provided with a central aperture, whose diameter is the greater, the further the auxiliary membrane is from the membrane 1. The leaves 1ᴵ and 1ᴵᴵ forming the auxiliary membranes consist mainly in guiding the vibrations of the membrane 1.

An acoustic instrument constructed according to this invention may consist of two or more instruments arranged in series or parallel.

It is obvious that while the single or plural membranes or diaphragms are preferably quite flexible and thin, they might be thickened to a material extent, in which case the valve or disc 3 will produce most of the sound.

Obviously numerous changes in construction and rearrangement of the parts might be resorted to without departing from the spirit of the invention as defined by the claims.

I claim:

1. An acoustic instrument comprising in combination a base member, a membrane with a central aperture forming an air passage connected to said base member, a disc closing the aperture in the membrane, a guide associated with said disc extending from the base member, a spring interposed between the membrane and base member and a cover secured to the base member enclosing the membrane.

2. An acoustic instrument comprising in combination a base member, a main membrane with a central aperture forming an air passage, auxiliary membranes associated with the main membrane each provided with a central aperture of increasing diameter, a disc acting upon said main membrane, a guide extending from the base member loosely supporting the disc, a spring interposed between the disc and base member and a cover secured to the base member enclosing the membranes.

3. An acoustic instrument comprising in combination a base member, a membrane with a central aperture forming an air passage connected thereto, a disc closing the aperture in the membrane, a guide extending from the base member loosely supporting the disc, a spring interposed between the disc and base member, a cover enclosing the membrane secured to the base member, an inter-changeable nozzle extending from the base member and an inter-changeable trumpet extending from the cover.

4. An acoustic instrument comprising in combination a housing, a membrane with a central aperture forming an air passage transversely secured and dividing the housing into two chambers, a spring controlled disc engaging said membrane and an interchangeable nozzle and trumpet associated with said housing.

5. An acoustical instrument including a casing, a member extending across said casing and formed with an opening, said casing being also formed with an opening, and a spring-pressed valve mounted within said casing and normally bearing in direct contact with said member to seal the opening therein.

6. An acoustical instrument including a casing, a vibratory diaphragm mounted therein and formed with an opening and a spring-pressed valve mounted within said casing and bearing normally in direct contact against said diaphragm to seal the opening therein.

7. An acoustical instrument including a casing formed with an opening, a plurality of diaphragms mounted within said casing and formed with openings and a spring-pressed member mounted within said casing and normally sealing one of the diaphragm openings.

8. An acoustical instrument including a casing formed with an opening, a plurality of diaphragms mounted within said casing and formed with openings of increasing area and a spring-pressed member mounted within said casing and normally sealing one of the diaphragm openings.

9. An acoustical instrument including a casing, a member closing said casing and spaced from the inner face thereof, said member being formed with an inlet opening, said instrument being formed with an outlet opening, a valve cooperating with said inlet opening and being disposed in the space between said member and casing, supporting means within said space, a valve stem extending rearwardly from said valve and a spring connected to said stem and supporting means to yieldingly support said valve adjacent said inlet opening.

In witness whereof I affix my signature.

ANTONIO GALBARINI.